US010771319B1

(12) United States Patent
Guo et al.

(10) Patent No.: US 10,771,319 B1
(45) Date of Patent: Sep. 8, 2020

(54) ROBUSTNESS VERIFICATION METHOD AND APPARATUS FOR DISTRIBUTED CONTROL PLANE IN SOFTWARE-DEFINED NETWORK

(71) Applicant: Deke Guo, Changsha (CN)

(72) Inventors: Deke Guo, Changsha (CN); Junjie Xie, Changsha (CN); Yang Guo, Changsha (CN); Junxu Xia, Changsha (CN); Siyuan Gu, Changsha (CN)

(73) Assignee: Deke Guo, Changsha, Hunan (CN)

( * ) Notice: Subject to any disclaimer, the term of this patent is extended or adjusted under 35 U.S.C. 154(b) by 0 days.

(21) Appl. No.: 16/849,703

(22) Filed: Apr. 15, 2020

(51) Int. Cl.
*H04L 12/24* (2006.01)
*H04L 12/26* (2006.01)

(52) U.S. Cl.
CPC ........ *H04L 41/0672* (2013.01); *H04L 41/069* (2013.01); *H04L 41/0636* (2013.01); *H04L 43/0823* (2013.01)

(58) Field of Classification Search
CPC ............. H04L 41/0672; H04L 41/0636; H04L 41/069; H04L 43/0823
See application file for complete search history.

(56) References Cited

U.S. PATENT DOCUMENTS

| | | | | |
|---|---|---|---|---|
| 8,898,520 B1* | 11/2014 | Ford | ...................... | G06F 9/546 |
| | | | | 714/15 |
| 2014/0198687 A1* | 7/2014 | Raleigh | .................. | G06Q 40/00 |
| | | | | 370/259 |
| 2014/0248852 A1* | 9/2014 | Raleigh | ............... | H04M 15/723 |
| | | | | 455/407 |
| 2018/0091357 A1* | 3/2018 | Hibino | .................. | H04L 41/046 |
| 2019/0041824 A1* | 2/2019 | Chavez | ............... | G06F 11/2023 |

* cited by examiner

*Primary Examiner* — Ian N Moore
*Assistant Examiner* — Latresa A McCallum
(74) *Attorney, Agent, or Firm* — Dragon Sun Law Firm, PC; Jinggao Li, Esq.

(57) ABSTRACT

Provided are a robustness verification method and apparatus for a distributed control plane in a software-defined network, including constructing a robustness verification framework, where the robustness verification framework accommodates a failure scenario set and a failure recovery strategy set; selecting a failure recovery strategy, and querying a worst failure scenario under the failure recovery strategy; verifying a utilization rate of a biggest controller in the control plane under the combination of the worst failure scenario and the failure recovery strategy; and verifying the robustness of the control plane based on the utilization rate. The verification problem of the control plane is taken as a robustness optimization problem under different failure cases and failure recovery strategies. After the failure recovery strategy is selected, the worst failure scenario is obtained to determine whether the performance of the control plane satisfies requirements.

12 Claims, 5 Drawing Sheets

ROBUSTNESS VERIFICATION METHOD AND APPARATUS FOR DISTRIBUTED CONTROL PLANE IN SOFTWARE-DEFINED NETWORK

CROSS-REFERENCE TO RELATED PATENT APPLICATION

This application claims priority to and the benefit of CN 2019103063912, filed Apr. 16, 2019, entitled "ROBUSTNESS VERIFICATION METHOD AND APPARATUS FOR DISTRIBUTED CONTROL PLANE IN SOFTWARE-DEFINED NETWORK," by Deke Guo et al. The entire disclosure of the above-identified application is incorporated herein by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference

TECHNICAL FIELD

The present disclosure relates to a performance verification method of a control plane and in particular to a robustness verification method and apparatus for a distributed control plane in a software-defined network.

BACKGROUND

At present, a software-defined network draws much attention of the academic circle and the industrial circle. The software-defined network allows a network operator to dynamically manage network resources and network behaviors. At the same time, the software-defined network makes the development of new network applications more flexible. The software-defined network decouples a data plane and a control plane of a network so that the control plane determines a path in which a flow travels and the data plane performs corresponding forwarding operation based on the decision of the control plane. The software-defined network maintains one network view with global consistency by using a control plane of one logic center. In order to guarantee availability and extendability of the control plane, such a control plane usually includes a plurality of distributed controllers.

The control plane of the logic center is a critical part of the software-defined network. Mapping of one designed control plane and a data plane can be achieved by allocating one available controller list (including one master controller and several slave controllers) to each switch. The master controller is in charge of receiving flow requests of switches covered by the master controller, calculating one routing decision for each flow and installing a flow rule to a relevant switch on the path. In this way, the switch can perform flow forwarding based on the routing decision made by the control plane. In order to achieve the above design, the control plane and the data plane must communicate with each other through a secure link. The secure link can be implemented to pass through a special control channel (out of band) or share a same network link (in-band) with the data plane.

When one control plane is designed, it is urgent to ensure a determined performance is provided within an acceptable cost. However, insufficient research is conducted for verifying whether the control plane satisfies requirements of a design target under different failure conditions at present. The problem is called a robustness verification problem of a distributed control plane. Due to the challenges of two aspects, the problem becomes very difficult. In the first aspect, the control plane may encounter the failure of the controller or the secure link, and such failure may disconnect the switch with its master controller so that the switch becomes an uncovered switch and can no longer process new flow requests. Such potential failures may be countless. In the second aspect, when different failure strategies are used to handle the failure, modeling of the performance of the control plane is still an open problem. The control plane selects one slave controller from the slave controllers of a switch that has never been covered as a new master controller. Because an additional uncovered switch is taken over, such operation allows some controllers to display a higher utilization rate. Obviously, the failure situation and the failure recovery strategy adopted by the control plane jointly affect the performance of the control plane.

Therefore, a heretofore unaddressed need exists in the art to address the aforementioned deficiencies and inadequacies.

SUMMARY

The object of the present disclosure is to provide a robustness verification method and apparatus for a distributed control plane in a software-defined network to solve the lack of verification of the performance of the control plane in an existing software-defined network in the prior art.

To solve the above problem, the present disclosure provides a robustness verification method of a distributed control plane in a software-defined network. The method includes the following blocks.

At block S1, a robustness verification framework is constructed, and the robustness verification framework contains a failure scenario set and a failure recovery strategy set.

At block S2, a failure recovery strategy is selected and the worst failure scenario under the failure recovery strategy is queried.

At block S3, a utilization rate of the biggest controller in the control plane under the combination of the worst failure scenario and the failure recovery strategy is verified.

At block S4, the robustness of the control plane is verified with the utilization rate.

Preferably, the method of querying the worst failure scenario at block S2 is a recursive algorithm.

Preferably, the failure scenarios are reduced by using the branch and bound method to reduce an operation time of the recursive algorithm.

Preferably, the formula used for verifying the robustness of the control plane at block S4 is as follows:

$$\max \hat{w}(v)$$
$$\text{s.t.} \begin{cases} \sum_{j=1}^{M} v_j^f \le f \\ \sum_{i=1}^{N} \sum_{j=1}^{M} v_{ij}^l \le l \\ \{v_j^f, v_{ij}^l\} \in \{0, 1\} \end{cases}$$

In the above formula, N is a number of switches in a control plane, M is a number of controllers in a control plane, $v^l_{ij}$ refers to a state of a secure link between the switch $s_i$ and the controller $c_j$, $v^f_j$ refers to a state of the controller $c_j$, and $\hat{w}(v)$ refers to a failure recovery strategy.

Preferably, at block S4, the manner of verifying the robustness of the control plane based on the utilization rate is determining a relationship of F* and 1. If F*<1, it is considered that the control plane can satisfy the design requirements and otherwise, capacity expansion is performed for the control plane.

Preferably, the capacity expansion is performed based on the following capacity expansion criterion:

$$\min_{\delta \geq 0}\max_{v \in V}\min \left\{ \sum_{j=1}^{M} \varphi_j \delta_j \left| \begin{array}{l} U\rho_j(1-v^f_j) \geq \sum_{i=1}^{|S-S^f|} r_i m^*_{ij} + \sum_{x=1}^{|S^f|} r_x m_{xj} \\ b_{xj}(1-v^l_{xj}) \geq m_{xj} \\ \sum_{j=1}^{M} m_{xj} = 1 \end{array} \right. \right\}$$

In the above criterion, V is a failure scenario set, v is a failure scenario, $\delta_j$ is the biggest utilization rate of the controller, $\varphi_j$ is a unit capacity cost of the controller, $v^l_{ij}$ refers to a state of secure link between the switch $s_i$ and the controller $c_j$, $v^f_j$ refers to a state of the controller $c_j$, $\rho_j$ refers to a cost for increasing one unit of capacity for the controller $c_j$, S refers to a set of switches, $S^f$ refers to a set of failed switches, $|S^f|$ refers to a number of the failed switches, $m_{xj}$ refers to whether the controller $c_j$ is the master controller of the switch $s_i$, and M refers to a number of controllers of the control plane.

Preferably, an expanded capacity is obtained by performing calculation for the capacity expansion criterion based on an iterative algorithm.

Based on the above method, the present disclosure further provides a robustness verification apparatus for a distributed control plane in a software-defined network, including a memory, a processor, and a computer program stored on the memory and executable on the processor, and its features That is, when the processor executes the computer program, any of the steps of the above method is implemented.

The apparatus includes the following modules:

a constructing module, configured to construct a robustness verification framework where the robustness verification framework contains a failure scenario set and a failure recovery strategy set;

a selecting module, configured to select a failure recovery strategy and query the worst failure scenario under the failure recovery strategy;

an obtaining module, configured to verify a utilization rate of the biggest controller in the control plane under the combination of the worst failure scenario and the failure recovery strategy;

and a verifying module, configured to verify the robustness of the control plane based on the utilization rate.

Preferably, the method of querying the worst failure scenario by the selecting module is a recursive algorithm.

Preferably, the failure scenarios are reduced by using the branch and bound method to reduce an operation time of the recursive algorithm.

Preferably, the formula used by the verifying module to verify the robustness of the control plane is as follows:

$$\max \hat{w}(v)$$
$$s.t. \begin{cases} \sum_{j=1}^{M} v^f_j \leq f \\ \sum_{i=1}^{N} \sum_{j=1}^{M} v^l_{ij} \leq l \\ \{v^f_j, v^l_{ij}\} \in \{0, 1\} \end{cases}$$

In the above formula, N is a number of switches in the control plane, M is a number of controllers in the control plane, $v^l_{ij}$ refers to a state of a secure link between the switch $s_i$ and the controller $c_j$, $v^f_j$ refers to a state of the controller $c_j$, and $\hat{w}(v)$ refers to a failure recovery strategy.

Preferably, the manner of verifying the robustness of the control plane by the verifying module based on the utilization rate is determining a relationship of F* and 1. If F*<1, it is considered that the control plane can satisfy the design requirements and otherwise, the capacity expansion is performed for the control plane.

Preferably, the capacity expansion is performed based on the following capacity expansion criterion:

$$\min_{\delta \geq 0}\max_{v \in V}\min \left\{ \sum_{j=1}^{M} \varphi_j \delta_j \left| \begin{array}{l} U\rho_j(1-v^f_j) \geq \sum_{i=1}^{|S-S^f|} r_i m^*_{ij} + \sum_{x=1}^{|S^f|} r_x m_{xj} \\ b_{xj}(1-v^l_{xj}) \geq m_{xj} \\ \sum_{j=1}^{M} m_{xj} = 1 \end{array} \right. \right\}$$

In the above criterion, V is a failure scenario set, v is a failure scenario, $\delta_j$ is the biggest utilization rate of the controller, $\varphi_j$ is a unit capacity cost of the controller, $v^l_{ij}$ refers to a state of secure link between the switch $s_i$ and the controller $c_j$, $v^f_j$ refers to a state of the controller $c_j$, $\rho_j$ refers to a cost for increasing one unit of capacity for the controller $c_j$, S refers to a set of switches, $S^f$ refers to a set of failed switches, $|S^f|$ refers to a number of the failed switches, $m_{xj}$ refers to whether the controller $c_j$ is the master controller of the switch $s_i$, and M refers to a number of controllers of the control plane.

Preferably, the expanded capacity is obtained by performing calculation for the capacity expansion criterion based on an iterative algorithm. The present disclosure includes the following beneficial effects.

1. In the present disclosure, the verification problem of the distributed control plane is taken as a robustness optimization problem under different failure situations and failure recovery strategies. Whether the performance of the control plane satisfies requirements is verified by obtaining the worst failure scenario after selecting the failure recovery strategy.

2. The present disclosure inventively provides an algorithm for querying the worst failure scenario to obtain the worst failure scenario quickly and accurately after selecting the failure recovery strategy.

3. After the robustness of the control plane is verified, the present disclosure provides an effective capacity expansion solution for the master controller of the control plane, so that the performance and the capability of the control plane are increased and the use requirements are better met.

BRIEF DESCRIPTIONS OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTIONS OF EMBODIMENTS

Figure 1:
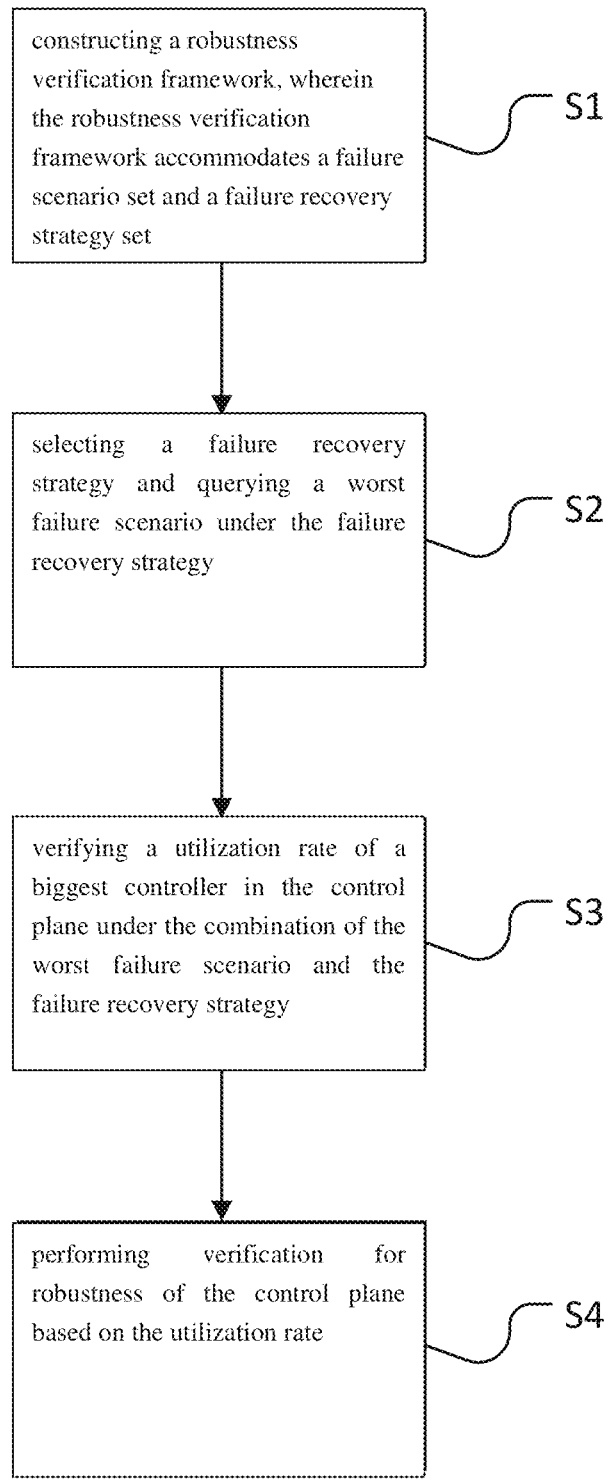
FIG. 1 is a flowchart illustrating a robustness verification method of a control plane in a software-defined network according to a preferred example of the present disclosure.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Example 1

The below SDN is a software-defined network, and the below MCU refers to the one with the biggest utilization rate in all controllers of a control plane.

As shown in FIG. 1, the present disclosure provides a robustness verification method of a distributed control plane in a software-defined network. The method includes the following blocks.

At block S1, a robustness verification framework is constructed and the robustness verification framework contains a failure scenario set and a failure recovery strategy set. The robustness verification framework is a mathematical formula with its main contents of calculating a utilization rate of each controller of the current control plane based on the failure scenario and the failure recovery strategy.

Figure 2:
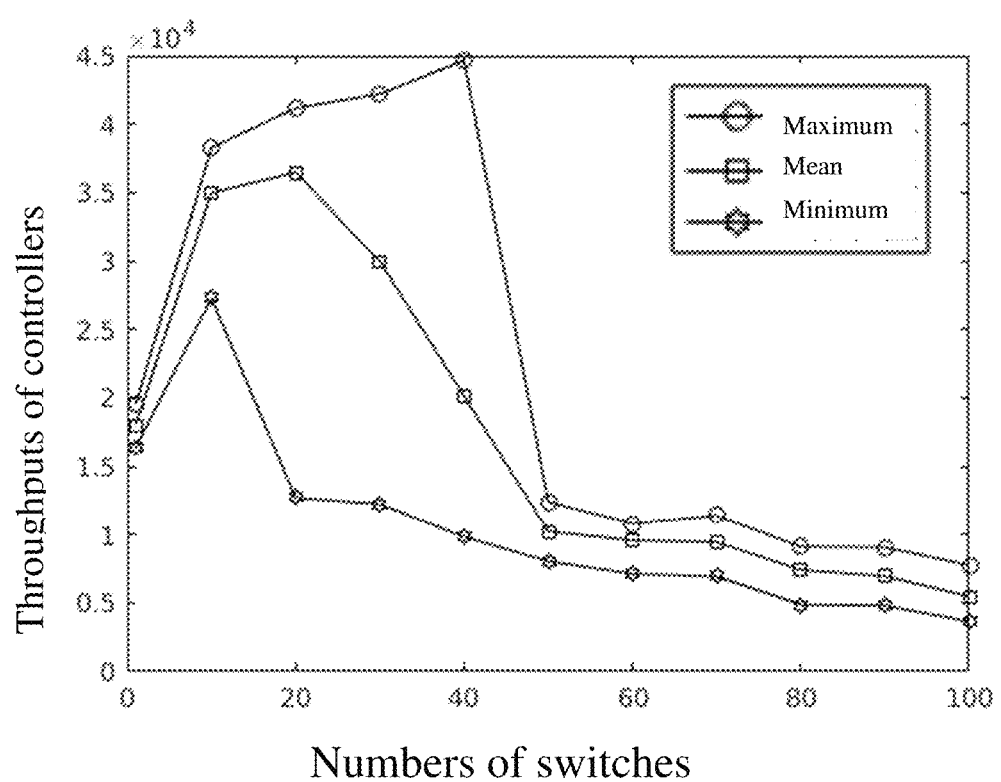
FIG. 2 is a change trend diagram of a throughput of a controller along with an increase of switches according to a preferred example of the present disclosure.

In the example, the biggest utilization rate of a master controller is mainly analyzed. If one controller can process a request number of $\rho$ flow/second, the utilization rate of the controller is defined as $U=r/\rho$. For any controller, the value of U directly affects the throughput and the response delay of the controller. The influence of the throughput of the controller is tested by using a cbench performance test kit, and the cbench and the controller are arranged on a machine with a CPU having a memory of 8 GB and Intel Core 2.4 GHz. Ten tests are performed under the set number of each switch. FIG. 2 depicts a change trend of the throughput of the controller on different numbers of switches. Obviously, when the number of the switches exceeds a threshold, the capacity of the controller will be saturate because each analog switch sends a request at the highest possible rate. Therefore, when the utilization rate of the controller exceeds 1, even if more requests are received, the throughput of the controller will start to decrease. As shown in FIG. 2, when the number of the switches exceeds 40, the maximum throughput decreases abruptly. As a result, we use the MCU to capture the performance of the distributed control plane for the failure in all available controllers. When the MCU is greater than 1, the control plane will no longer satisfy the interested requirements.

The secure link is an infrastructure of a control channel for connecting the switch and the controller. The failure of the secure link will disconnect the switch from the master controller. Thus, the failure of the secure link will result in the phenomenon of connection loss. Further, the failure of the controller may result in disconnection of the switches from the master controller. The failure scenario includes a controller failure and a secure link failure.

A flow request generated by a switch may be predicted from a historical record. The verification framework may be optimized with a historical flow matrix $\{r^i\}_{i \in H}$, where $H=\{1, 2, \ldots, h\}$. A predictor usually estimates a flow matrix of a given interval based on a convex combination of a known matrix. The $\{r^1, r^2, \ldots, r^h\}$ of a designed convex hull is verified to ensure all controllers may respond to request all flow switches to be maintained at a reasonable utilization. Specifically, modeling may be performed by substituting $r_i$ as a constraint based on the formula $r_i = \Sigma_{j \in H} y_j r_i^j \geq 0$, $\Sigma_{j \in H} y_j = 1$, where $r_i$ refers to the number of flow requests generated by the switch $s_i$ each second.

The core idea of the verification framework is the robustness optimization theory. In an uncertain parameter set, a given target function is minimized. In an optimization process, a plurality of rich adaptive strategies may be used based on specific application scenarios. In an SDN scenario, the uncertain parameter set refers to an uncertain failure scenario. Such failure scenario includes the failures of the controller and the secure link. V refers to an uncertain failure set, which may be countless. However, the designing of the distributed control plane must be subjected to verification. W refers to the failure recovery strategy determined by the control plane, which corresponds to the failure situation. That is, W indicates the new master controllers of those uncovered switches. In the format, the verification problem of the distributed control plane may be written as:

$$F^* = \max_{v \in V} \min_{w \in W} F(v, w) \qquad (1)$$

For any given scenario $v \in V$, the control plane selects w from one group of permission strategies W(v) to minimize the target function F(v,w). The selected W ensures each uncovered switch arising from the failure scenario v will obtain one unique new master controller. A plurality of permission strategies may exist in each solution V because each unopened switch may have a plurality of slave controllers and each controller has a chance to be selected as a master controller. If each failure scenario V of the control plane adapts to the best strategy, the robustness is maximized externally to capture a group of master controller performances under the worst failure scenario V. Thus, the formula (1) shows that the robustness verification problem is to verify whether the performance of the control plane satisfies the interested requirements in the worst failure case and the optimal failure recovery strategy is adopted.

The MCU measure serves as a target function F(v,w), which reflects the performance of the distributed control plane. The formula (1) is referred to as a verification problem because the formula is used to verify a given distributed control plane satisfies a desired optimization target. For example, when F*>1, it indicates that the distributed control plane is not sufficiently prepared to process all flow requests.

We use one symbol $v=(v^l, v^f)$ to refer to a general failure scenario encountered by the distributed control plane, where $v^l$ refers to a failure scenario of a secure link, $v^f$ refers to a failure of a controller, $v^l_{ij}=1$ refers to a failure occurs to the secure link between the switch $s_i$ and the controller $c_j$, and otherwise, it is zero. $v^f_j=1$ refers to the controller $c_j$ fails and otherwise it is zero. $m_{ij}$ refers to mapping of the switch $s_i$ and the controller $c_j$, $m_{ij}=1$ refers to the controller $c_j$ is the master controller of the switch $s_i$, and otherwise it is zero. At the same time, when $v^l_{ij}=1$ or $v^f_j=1$, $m_{ij}=0$ indicates that the switch $s_i$ loses connection with the initial master controller $c_j$. In this case, a new master controller of the switch $s_i$ is reselected based on the failure recovery strategy. Afterwards, the new master controller will take over the switch. Thus, the utilization rate of the new master controller will increase due to the additionally-taken-over switch $s_i$.

Similarly, we define one symbol w=(m,U), where m= $[m_{ij}]_{N \times M}$ refers to mapping of N switches and M controllers, and U refers to a desired utilization measure. It is considered that we focus on minimizing the MCUs between all controllers. The inherent problem of the formula (1) may be represented as $$\min_{w \in W(v)} U,$$

that is, me utilization rate or each controller is U at most, the constraint of the failure recovery strategy corresponds to W(v). The formula (1) refers to a formula problem of two stages. The optimal variable (w) of the second stage depends on (v) of the first stage. For simplified calculation, the problem may be re-represented as one single-level optimization problem and all variables may be determined at the same time. Further, we define the verification problem as an integer programming (IP). Herein, v refers to a group of failed scenarios, including failures of f or fewer controllers and simultaneous failures of l or fewer secure links. In any failure case v, we use ŵ(v) to represent the obtained failure recovery strategies. Thus, the robustness verification may be formalized into the equation (2):

$$\max \hat{w}(v) \quad (2)$$
$$\text{s.t.} \begin{cases} v \in V \\ \{v^f_j, v^l_{ij}\} \in \{0, 1\} \forall i, j \end{cases}$$

Our target is to solve the verification problem including design of the control plane and the availability of the control plane for the uncertain failure. Specifically, we consider the simultaneous failures of L or fewer secure links and F or fewer controllers are involved in all failure cases. The above failure model is a general practice. The model result is obtained by substituting $$\sum_{j=1}^{M} v^f_j \leq f, v^f_j \in \{0, 1\}$$

and $$\sum_{i=1}^{N} \sum_{j=1}^{M} v^l_{ij} \leq l, v^l_{ij} \in \{0, 1\}$$

into the formula (2) with constraint v∈V.

At block S2, the failure recovery strategy is selected and the worst failure scenario under the failure recovery strategy is queried.

The failure recovery strategy is already selected when the control plane is deployed.

The control plane may solve the failure scenario in a special adaptive manner, so that high availability and low MCU of the control plane are retained, which may be achieved by determining an optimal new master controller for each unopened switch not reaching the initial master controller in a given failure case. The selection problem of the optimal master controller minimizing MCUs is defined as an ummr problem, which is proved to be formalized failure recovery strategy of NP-hard. Therefore, the control plane uses the failure recovery strategy as main (reselect the master controller) in the failure verification problem. In the current design, each available switch forms a list controller with a priority. When the switch cannot communicate with the master controller, one slave controller of the switch is selected sequentially as one new master controller. The failure recovery strategy is far from optimal. One effective failure recovery strategy should fully use a remaining capacity of the control plane. The failure recovery strategy is determined by the operator during deployment, and the failure recovery strategy is applicable to the verification framework of the example. No matter what failure recovery strategy is selected by the operator, the verification method of the example may be used for verification. The specific selection may be performed so that the performance of the control plane is fully exerted.

The key of the robustness verification is to find out the worst failure scenario. If the performance of the control plane can satisfy the interested requirements in the worst case, we consider the design of the control plane can accommodate all failure scenarios. Generally, it is difficult to find out the worst failure scenario for the original verification problem, and a high MCU will be generated, which will be multiplied or potentially countless in the failure case.

However, we find through analysis that the formula (3) is easy to process and we find the worst failure scenario based on the recursive algorithm. The details of the recursive algorithm are shown in Algorithm 2. Further, we design a branch and bound method to effectively reduce the operation time of the algorithm 2.

| Algorithm 2: FWorst find the worst failure scenario |
|---|
| 1.  Define and initialize two global variables $\hat{V}$ 和 $\hat{U}$; |
| 2.  Initialize variable V, U, level ← 0, start ← 1; |
| 3.  Function GetMCU(start, V, U, level); |
| 4.  Return $\hat{V}$ and $\hat{U}$; |
| 5.  Function GetMCU(start, V, U, level) |
| 6.    Variable Level ++; |
| 7.    If level > f then |
| 8.        Return; |
| 9.    End if |
| 10.   For j = start to M do |
| 11.      If $v^f_j$ == 1 then |
| 12.         Continue; |
| 13.      Else |
| 14.         Controller cj fails $v^f_j$ ← 1; |
| 15.         Update failure scenario Update V; |
| 16.         Calculate the biggest utilization rate of the control plane at this time Calculate w(V); |
| 17.         If w(V) > $\hat{U}$ then |
| 18.            Update the biggest utilization rate $\hat{U}$ ← w(V); |
| 19.            Update the worst failure scenario $\hat{V}$ ← V; |
| 20.         End if |
| 21.         GetMCU(start, V, U, level); |
| 22.            Controller cj recovers to normal state $v^f_j$ ← 0; |
| 23.         update failure scenario Update V; |
| 24.      End if |
| 25.   End for |
| 26.  End function |

In the algorithm 2, two global variables, i.e. v and u, are defined firstly to record the worst failure scenario and the highest MCU respectively. Then, two set variables v and v are initialized and the variables of the two sets are set to zero. At the start, the variables Û, U, level are all zero, and start=1. In the algorithm 2, the function getmcu( ) is invoked to calculate $\hat{V}$, $\hat{U}$ and the depth value of the recursive function getmcu( ) recorded by the variable level. Herein, the maximum value of the recursion depth is f, where f is the maximum number of the simultaneously failed controllers. The function getmcu( ) is used to calculate the solution of w(v) for each failure. If one failure scenario generates a larger w(v) than a previously-verified failure scenario, the failure scenario will be recorded. The recursive algorithm will be terminated with a returned calculation result being at a level f. Further, to verify the failure of the secure link, the level value may reach L, where L is the maximum number of the simultaneously failed secure links. At the same time, at block 10, for cycle length should be equal to the number of the secure links. To verify the mixed failure of the controller and the secure link, the maximum value is f+1, and the for cycle length should be from start to m. The variable start may reduce the operation time of the algorithm 2 while ensuring the optimal value.

Although the algorithm 2 is feasible, it still takes a long time to derive a final solution. To reduce the operation time of the algorithm 2, we use the branch and bound method to reduce a large quantity of failure scenarios. In this way, a higher MCU will not be generated. In the worst failure case, one unopened switch will only retain some available controllers or even one controller. Thus, even in the case of a high utilization rate, the controller may take over the switch. It is noted that each unopened switch has k available controllers.

At block S3, the utilization rate of the biggest controller in the control plane under the combination of the worst failure scenario and the failure recovery strategy is obtained.

At block S4, the robustness of the control plane is verified based on the utilization rate.

The key of the verification problem is to find out the worst failure scenario. Thus, we obtain the formula (3) by simplification:

$$\max \hat{w}(v) \quad (3)$$

$$\text{s.t.} \begin{cases} \sum_{j=1}^{M} v^f_j \leq f \\ \sum_{i=1}^{N} \sum_{j=1}^{M} v^l_{ij} \leq l \\ \{v^f_j, v^l_{ij}\} \in \{0, 1\} \end{cases}$$

Our verification problem corresponds to a scenario v to fail, and the inherent problem $$\min_{w \in W(v)} F(v, w)$$

is a fixed failure recovery strategy of the variable w=(m,U), which minimizes the utilization rate of the control plane.

By relaxing the formula (3), the following formula for verifying the robustness of the control plane is obtained:

$$\max \hat{w}(v) \quad (4)$$

$$\text{s.t.} \begin{cases} \sum_{j=1}^{M} v^f_j \leq f \\ \sum_{i=1}^{N} \sum_{j=1}^{M} v^l_{ij} \leq l \\ \{v^f_j, v^l_{ij}\} \in \{0, 1\} \end{cases}$$

In the above formula, N is a number of switches in the control plane, M is a number of controllers in the control plane, $v^l_{ij}$ refers to a state of a secure link between the switch $s_i$ and the controller $c_j$, $v^f_j$ refers to a state of the controller $c_j$, and max $\hat{w}(v)$ is a failure recovery strategy.

Preferably, at block S4, the manner of verifying the robustness of the control plane based on the utilization rate is determining a relationship of F* and 1. If F*<1, it is considered that the control plane can satisfy the design requirements and otherwise, capacity expansion is performed for the control plane.

Preferably, capacity expansion is performed based on the following capacity expansion criterion:

$$\min_{\delta \geq 0} \max_{v \in V} \min \left\{ \sum_{j=1}^{M} \varphi_j \delta_j \left| \begin{array}{l} U\rho_j(1-v_j^f) \geq \\ \sum_{i=1}^{|S-S^f|} r_i m_{ij}^* + \sum_{x=1}^{|S^f|} r_x m_{xj} \\ b_{xj}(1-v_{xj}^l) \geq m_{xj} \\ \sum_{j=1}^{M} m_{xj} = 1 \end{array} \right. \right\} \quad (5)$$

In the above criterion, V is a failure scenario set, v is a failure scenario, $\delta_j$ is the biggest utilization rate of the controller, and $\varphi_j$ is the cost for unit capacity of the controller.

In the formula (5), the set v contains all failure scenarios. We increase the capability $\delta_j$ of the controller $c_j$. Let $\varphi_j$ represent the cost of the unit capacity. The first constraint condition is enhanced after the captured number of flow requests received by the controller $c_j$ shall not exceed its capacity $\rho_j+\delta_j$. The MIN of the outmost layer may minimize the cost of increasing the capacity.

The formula (5) is a relaxed LP which is operated to determine the worst failure case resulting in the highest MCU. Those branches with MCU<1 will be trimmed and those unknown switches will be continuously accessed. The process will be repeated until the failure case is found and MCU>1. It indicates that the current design cannot adapt to the failure scenario. During the search process, the problem of the number of many LPS serving as the unopened switches in the network is solved at most to find the worst failure case, resulting in high MCU. That is, the number of the detected branches is substantially equal to the number of the unopened switches. If the solutions of LPS of all MCUs are smaller than 1, it indicates the designed control plane may bear all failure cases.

Enlightened by the solution of the formula (1), we use the iteration method to solve the formula (5) for increasing the capacity. During each iteration, we need to perform capability enhancement for the controller with the biggest utilization rate to allow the utilization rate to be below 1 after selecting the failure recovery strategy in the case of firstly determining the worst failure. In the next iteration, we solve the verification problem of the formula (1) to identify the worst failure scenario after updating the capacity of the control plane. The iteration solution can effectively increase the capacity in an actual application.

Figure 8:
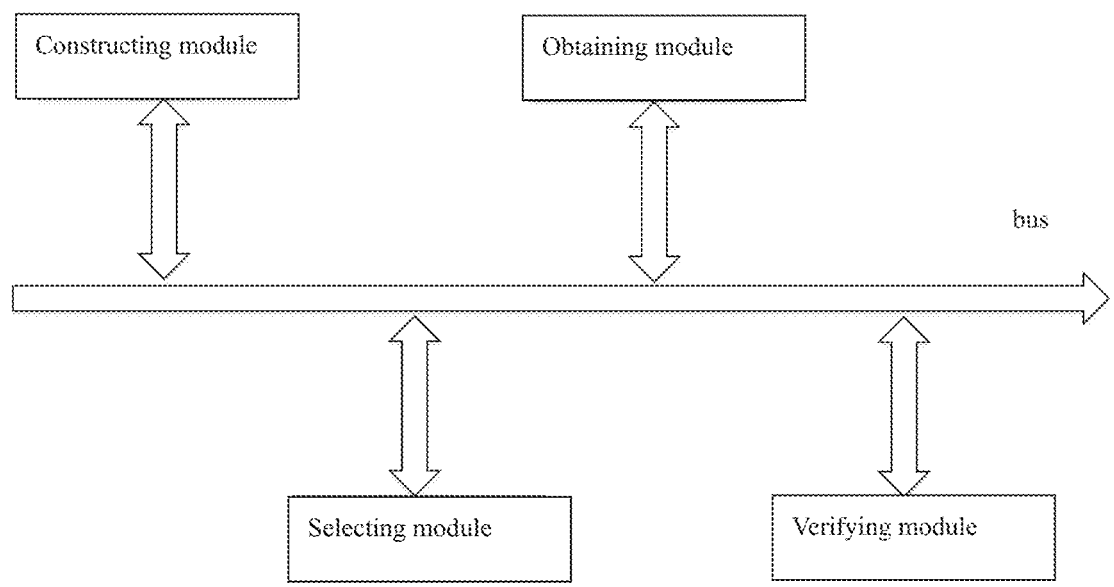
FIG. 8 is a structural diagram of a robustness verification system for a distributed control plane in a software-defined network according to a preferred example of the present disclosure.

Based on the above method, the present disclosure further provides a robustness verification apparatus for a distributed control plane in a software-defined network. As shown in FIG. 8, the apparatus includes:

a constructing module, configured to construct a robustness verification framework where the robustness verification framework contains a failure scenario set and a failure recovery strategy set;

a selecting module, configured to select a failure recovery strategy and query the worst failure scenario under the failure recovery strategy;

an obtaining module, configured to verify a utilization rate of the biggest controller in a control plane under the combination of the worst failure scenario and the failure recovery strategy; and a verifying module, configured to verify the robustness of the control plane based on the utilization rate.

Preferably, the method of querying the worst failure scenario by the selecting module is a recursive algorithm.

Preferably, the failure scenarios are reduced by the branch and bound method to reduce the operation time of the recursive algorithm.

Preferably, the formula used by the verifying module to verify the robustness of the control plane is as follows:

$$\max \hat{w}(v)$$

$$\text{s.t.} \begin{cases} \sum_{j=1}^{M} v_j^f \leq f \\ \sum_{i=1}^{N} \sum_{j=1}^{M} v_{ij}^l \leq l \\ \{v_j^f, v_{ij}^l\} \in \{0, 1\} \end{cases}$$

In the above formula, N is a number of switches in the control plane, M is a number of controllers in the control plane, $v^l_{ij}$ refers to a state of a secure link between the switch $s_i$ and the controller $c_j$, $v^f_j$ refers to a state of the controller $c_j$, and $\hat{w}(v)$ refers to a failure recovery strategy Preferably, the manner of verifying the robustness of the control plane by the verifying module based on the utilization rate is determining a relationship of F* and 1. If F*<1, it is considered that the control plane can satisfy the design requirements and otherwise, capacity expansion is performed for the control plane.

Preferably, capacity expansion is performed based on the following capacity expansion criterion:

$$\min_{\delta \geq 0} \max_{v \in V} \min \left\{ \sum_{j=1}^{M} \varphi_j \delta_j \left| \begin{array}{l} U\rho_j(1-v_j^f) \geq \sum_{i=1}^{|S-S^f|} r_i m_{ij}^* + \sum_{x=1}^{|S^f|} r_x m_{xj} \\ b_{xj}(1-v_{xj}^l) \geq m_{xj} \\ \sum_{j=1}^{M} m_{xj} = 1 \end{array} \right. \right\}$$

In the above formula, V is a failure scenario set, v is a failure scenario, $\delta_j$ is the biggest utilization rate of the controller, $\varphi_j$ is a unit capacity cost of the controller, $v^l_{ij}$ refers to a state of secure link between the switch $s_i$ and the controller $c_j$, $v^f_j$ refers to a state of the controller $c_j$, $\rho_j$ refers to a cost for increasing one unit of capacity for the controller $c_j$, S refers to a set of switches, $S^f$ refers to a set of failed switches, $|S^f|$ refers to a number of the failed switches, $m_{xj}$ refers to whether the controller $c_j$ is the master controller of the switch $s_i$, and M refers to a number of controllers of the control plane.

Preferably, an expanded capacity is obtained by performing calculation for the capacity expansion criterion based on an iterative algorithm.

Example 2

Figure 7:
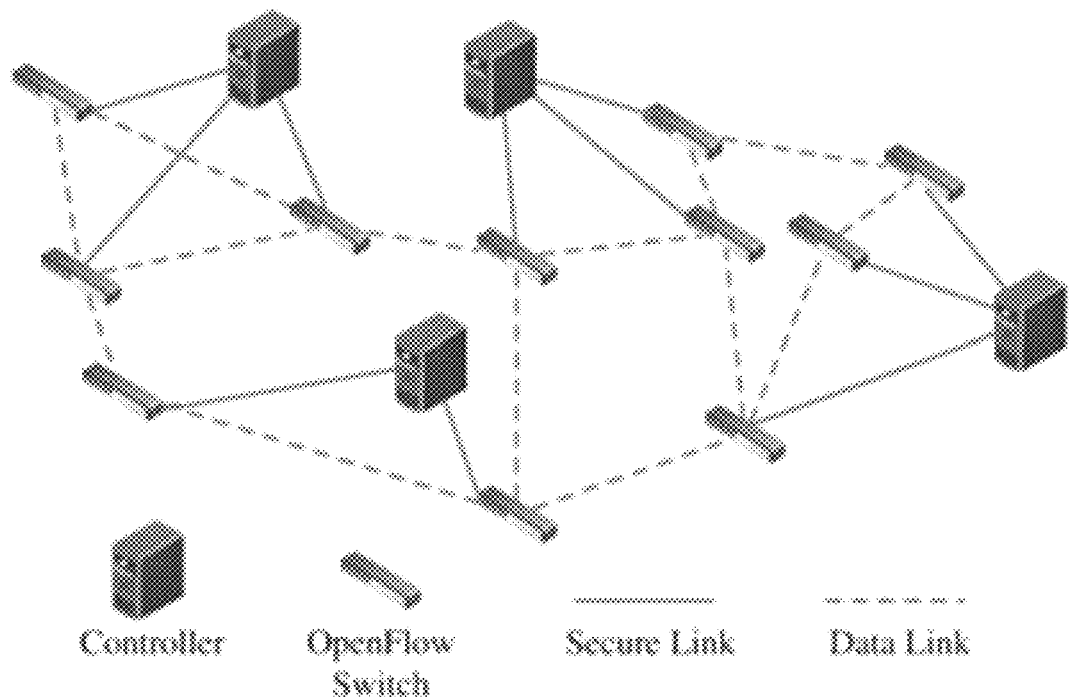
FIG. 7 is a topological diagram of an apparatus when a small-scale SDN platform performs a simulation test according to a preferred example of the present disclosure.

As shown in FIG. 7, in the example, we conducted a real test on a small-scale SDN test platform. We firstly deploy one small-scale SDN platform adopting an open-source controller platform, Falcon 1.5.0 SDN switch and Pica8 P-329 10-gigabit switch. The SDN switch is implemented as industry-wide leading OpenFlow 1.4 protocol configuration Open vSwitch integration (OVS). Such OpenFlow switches are based on topological structure of the Abilene internet backbone network. The real flow of the Abilene backbone network of Apr. 14, 2004 is adopted and injected into our test platform. It is noted that the flow data is recorded once every five minutes. For the flow recorded in the flow matrix, relevant source switch will send a flow request to its master controller to configure a routing path. The capacity of each controller is set to 500 because the flow tracking indicates that no too many flow requests are received per second. The SDN test bed adopts Pica8 switch and ONOS controller and the network topology is Abilene backbone network topology.

Figure 3:
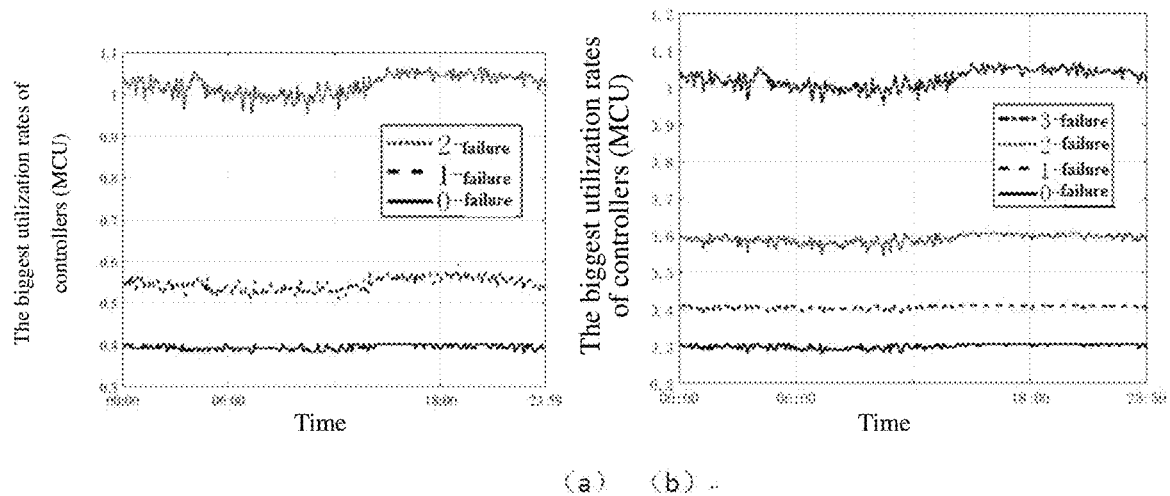
FIG. 3 is a comparison diagram of influences of failures tested on a SDN test bed for a MCU according to a preferred example of the present disclosure.

Firstly, we use three controllers to verify the performance of the control plane. As can be seen from FIG. 3 (a), when no failure occurs, MCU fluctuates around 40%. At the same time, FIG. 3(a) indicates the design of the control plane with three controllers is resilient for all scenarios of one failed controller. In this case, MCU fluctuates around 55%. However, the control plane cannot accommodate all failure scenarios of two controllers because the MCU will exceed 1 at a particular moment. Further, we consider that our another test platform is provided with four controllers. In this case, we use new topology to verify the design of the control plane as shown in FIG. 2. FIG. 3 (b) indicates that MCU always fluctuates around 60%. Therefore, the control plane can accommodate all failure scenarios of two controllers. However, when three controllers fail simultaneously at some time, the MCU will exceed 1. It indicates that the control plane cannot recover the failures of the three controllers in the worst case.

At the same time, the MCU always changes time slot within one day. As shown in FIG. 3, the fluctuation amplitude is not large. Specifically, in the case that three controllers fail simultaneously, MCU is always lower than 1 from 6:00 AM to 12:00 AM but higher than 1 from 12:00 AM to 6:00 PM as shown in FIG. 3 (b). The above case results from different flow requirements. It is noted each switch generates a flow request based on actual tracking of our test platform verification. For other actual application programs, we use many existing methods to predict flow requests.

Example 3

In the example, we conducted assessment for a large scale simulation test. We use two actual and typical topological structures: topologies of a campus network and a 16-meta-fat-tree data center are used to carry out large scale simulation. The former topological structure contains 100 switches, 397 links and 200 servers and the latter topological structure contains 320 switches, 3072 links and 1024 servers. We suggest all LPSs and IPSs solve CPLEX. Each server generates 500 flow requests per second on average.

When there is no failed controller, the utilization rate of the entire control plane is about 50%. The number of the flow requests and the capacity of the controller may be adjusted in practice. The setup of the two factors determines the number of the controllers used by the control plane. But, the effectiveness of our verification framework is not affected. To show that our verification framework can accommodate rich failure recovery strategies, we compare four failure recovery strategies: MM selection strategy, RB selection strategy, optimal solution (solve with small scale) and the previous selection strategy. When the master controller of the switch fails, one slave controller is selected based on the previous selection strategy to replace the initial master controller. With different setups of the number and capacity of the controllers, it is verified whether the design of the control plane satisfies the requirements of MCU.

Figure 4:
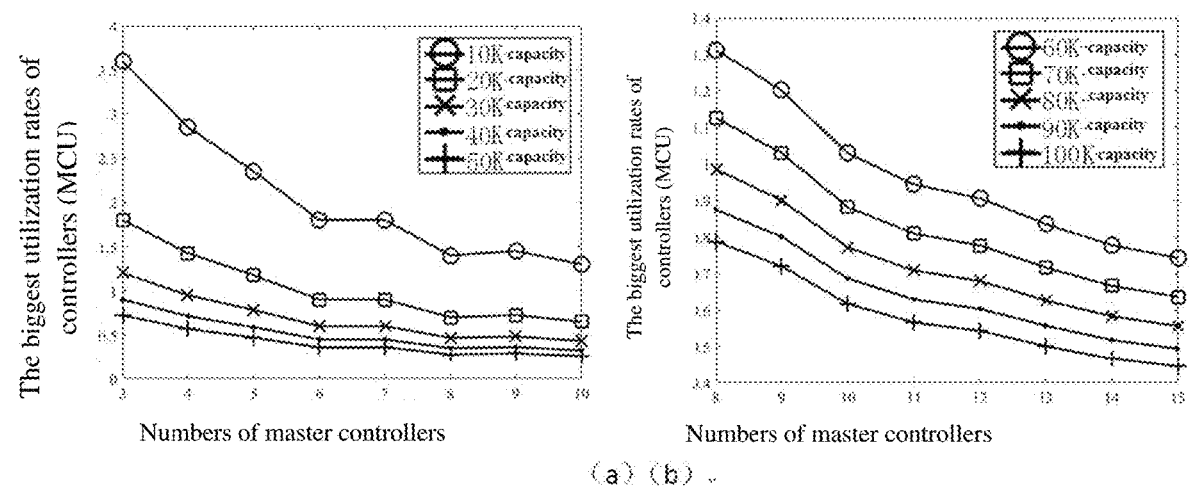
FIG. 4 is a comparison diagram of influences of a number of controllers on a MCU under different capability setups of controllers according to a preferred example of the present disclosure.

Campus Network:

The number of the controllers deployed in the campus network increases from 3 to 10 and each controller manages the same number of switches as possible. Each controller changes from the capacity of about 10K. FIG. 4 (a) shows a verification result of a control plane. As required by design, the MCU has no failure in the case of less than 70% and the control plane requires at least four controllers and each controller has the capacity of 50K. As a result, ten controllers with each having the capacity of 20K can satisfy the design requirements. Further, if the control plane requires the MCU shall not exceed 40% and five controllers can satisfy the needs, each controller has the capacity of 50K.

To reflect a difference of flow request numbers generated by different switches, the flow request number generated by each server is randomly set between 100 and 1000. The number of controllers ranges from 8 to 15 and each controller increases 60,000 100K-capacities. FIG. 4 (b) shows change trend of MCU along with increase of the number of controllers. As can be seen from FIG. 4 (b), when the number of the controllers increases, the MCU will decrease. Further, when each controller has higher capacity, lower MCU is achieved. Further, the verification result may direct the designing of the control plane. For example, in the case of interested requirements, the MCU is below 60%. FIG. 4 (b) shows the control plane needs at least 11 controllers with each having the capacity of 100K. However, 15 controllers are disposed sufficiently to satisfy the interested requirements if each controller has high capacity.

Figure 5:
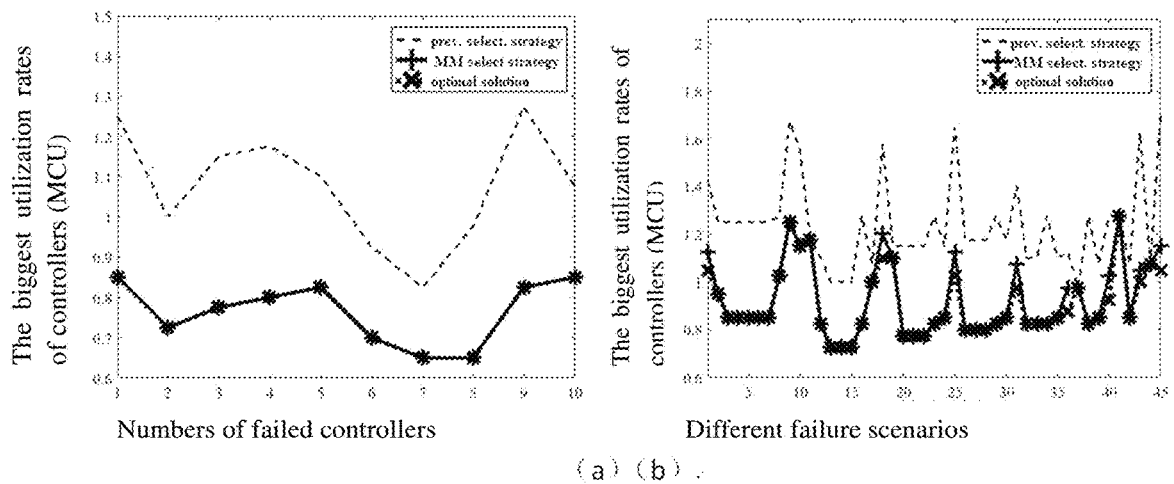
FIG. 5 is a comparison diagram of searching for the worst failure scenario under different failure recovery strategies in a campus network according to a preferred example of the present disclosure.

Verification of Campus Network:

The campus network adopts 10 controllers which are disposed in the flow request process of up to 20k per second respectively. FIG. 5 (a) depicts an optimal strategy in the failure case that our MM selection strategy reaches the same MCUs. When similar results are observed in FIG. 5 (b), the MCU is the case that two failures less than 1 occur at the same time. However, compared with the optimal strategy, the MM selection strategy obtains some failures when the MCU is higher than 1.

Figure 6:
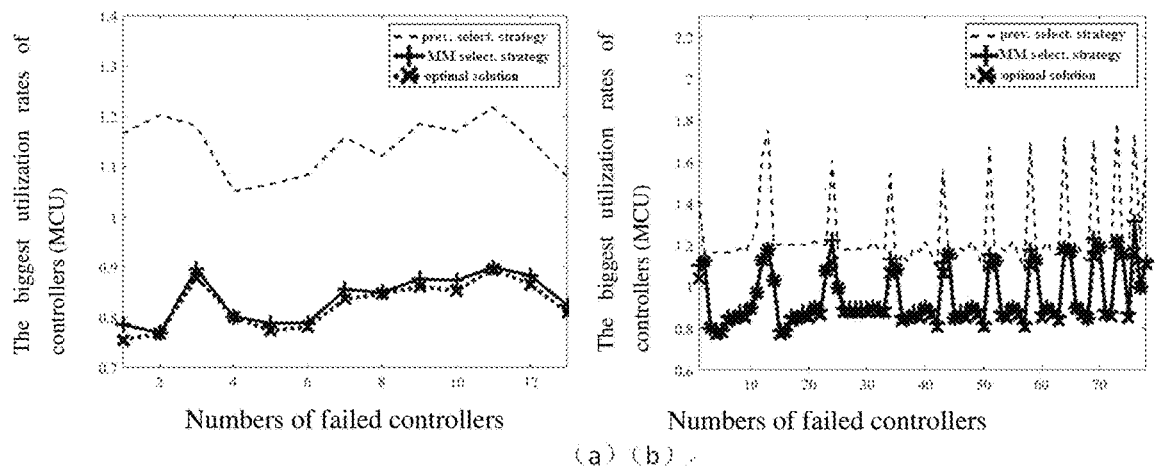
FIG. 6 is a comparison diagram of searching for the worst failure scenario under different failure recovery strategies in a data central network according to a preferred example of the present disclosure.

Verification of Data Center Network:

To process a large quantity of flow requests in the data center, the control plane adopts 13 controllers with each capable of processing 80 thousand flow requests per second. The assessment result is depicted in FIG. 6 (a). Obviously, when we adopt the MM selection strategy, all MCUs are not greater than 1. It indicates that the current design of the control plane may handle all 1-failure scenarios mm under our selection strategy. However, FIG. 6 (b) shows some scenarios in which more than one failure occur to the MCU. Therefore, even if the optimal strategy is adopted, the control plane cannot bear the worst case of two failures. Further, different failure recovery strategies are adopted based on different highest MCUs as shown in FIG. 6 (b). The highest MCU is 1.315 which is achieved in the 76-th failure scenario when our mm selects the failure recovery strategy. However, when the control plane adopts the previous failure recovery strategy, our verification framework identifies the 73-rd failure scenario as the worst case of 1.79 MCU. As a result, our verification framework uses closely-mutually-dependent failure recovery strategies. Before verification is performed, it is critical to determine the optimal failure recovery strategy of the control plane.

Directing Capability Enhancement of Control Plane:

We have found that the design of the control plane cannot handle the scenario in which two controllers fail simultaneously in the campus network. To satisfy the requirements of the network for the performance of the control plane, Table 1 shows an iteration solution used to gradually increase the capacity of the control plane in the campus network.

TABLE 1

Enhancing the capability of the control plane based on the iteration steps in the campus network

| Iteration solution | | Verification steps | | Enhancement steps |
|---|---|---|---|---|
| Iteration step number | MCU | Worst failure scenario | Identified controller | New (old) capability value |
| 1 | 1.275 | c7 and c9 | c8 | 25.5K (20K) |
| 2 | 1.25 | c1 and c10 | c9 | 25K (20K) |
| 3 | 1.2 | c3 and c4 | c2 | 24K (20K) |
| 4 | 1.175 | c2 and c4 | c3 | 23.5K (20K) |
| 5 | 1.15 | c2 and c3 | c1 | 23K (20K) |
| 6 | 1.1 | c3 and c5 | c4 | 22K (20K) |
| 7 | 1.05 | c1 and c2 | c10 | 21K (20K) |
| 8 | 1.05 | c8 and c9 | c7 | 21K (20K) |
| 9 | 1.05 | c7 and c8 | c6 | 20.5K (20K) |
| 10 | 1.0 | — | — | — |

The iteration process includes two steps: verification step and enhancement step. In the first step, it is verified whether the biggest utilization rate of the control plane is MCU<1. When MCU>1, a controller with the highest MCU and relevant worst failure scenario is identified in the verification step. For example, the controller C8 has the biggest utilization rate and worst failure scenario in the first row of table 1, which means the controllers C7 and C9 fails at the same time. In the second step, the enhancement capability of the identified controller is minimized and the worst failure scenario is handled at the same time. The capacity of the controller C8 starts from 20K. To handle the simultaneous failures of the C7 and C9, the capacity of the controller C8 shall be increased by at least 5.5k. In the subsequent verification step, another highest MCU will be present. In this case, the new worst failure scenario will be identified and enhancement step is repeated. When the iteration terminates, verification step of MCU<=1 is performed. Further, some actual constraints may be easily incorporated into the enhancement step.

The above are merely descriptions of some preferred examples of the present disclosure and shall not be intended to limit the present disclosure. Persons skilled in the prior art may make different changes and modifications to the present disclosure. Any modifications, equivalent substitutions and improvements and so on made within the sprits and principle of the present disclosure shall be encompassed in the scope of protection of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A robustness verification method of a distributed control plane in a software-defined network, comprising:
    at block S1, constructing a robustness verification framework, wherein the robustness verification framework accommodates a failure scenario set and a failure recovery strategy set;
    at block S2, selecting a failure recovery strategy and querying a worst failure scenario under the failure recovery strategy;
    at block S3, verifying a utilization rate of a biggest controller in the control plane under the combination of the worst failure scenario and the failure recovery strategy; and
    at block S4, performing verification for robustness of the control plane based on the utilization rate;
wherein the formula used for performing verification for the robustness of the control plane at block S4 is as follows:

$$\max \hat{w}(v)$$
$$\text{s.t.} \begin{cases} \sum_{j=1}^{M} v_j^f \leq f \\ \sum_{i=1}^{N} \sum_{j=1}^{M} v_{ij}^l \leq l \\ \{v_j^f, v_{ij}^l\} \in \{0, 1\} \end{cases}$$

wherein N is a number of switches in the control plane, M is a number of controllers in the control plane, $v_{ij}^l$ refers to a state of a secure link between the switch $s_i$ and the controller $c_j$, $v_j^f$ refers to a state of the controller $c_j$, and max $\hat{w}(v)$ is a failure recovery strategy.

2. The robustness verification method according to claim 1, wherein the method of querying the worst failure scenario at block S2 is a recursive algorithm.

3. The robustness verification method according to claim 2, wherein failure scenarios are reduced by the branch and bound method to reduce an operation time of the recursive algorithm.

4. The robustness verification method according to claim 1, wherein the manner of verifying the robustness of the control plane based on the utilization rate at block S4 is determining a relationship of F* and 1, and if F*<1, it is considered that the control plane satisfies design requirements and otherwise capacity expansion is performed for the control plane.

5. A robustness verification method of a distributed control plane in a software-defined network, comprising:
    at block S1, constructing a robustness verification framework, wherein the robustness verification framework accommodates a failure scenario set and a failure recovery strategy set;
    at block S2, selecting a failure recovery strategy and querying a worst failure scenario under the failure recovery strategy;
    at block S3, verifying a utilization rate of a biggest controller in the control plane under the combination of the worst failure scenario and the failure recovery strategy; and
    at block S4, performing verification for robustness of the control plane based on the utilization rate;

wherein the manner of verifying the robustness of the control plane based on the utilization rate at block S4 is determining a relationship of F* and 1, and if F*<1, it is considered that the control plane satisfies design requirements and otherwise capacity expansion is performed for the control plane, wherein the capacity expansion is performed based on the following capacity expansion criterion:

$$\min_{\delta\geq 0}\max_{v\in V}\min\left\{\sum_{j=1}^{M}\varphi_j\delta_j \left| \begin{array}{l} U\rho_j(1-v_j^f) \geq \sum_{i=1}^{|S-S^f|} r_i m_{ij}^* + \sum_{x=1}^{|S^f|} r_x m_{xj} \\ b_{xj}(1-v_{xj}^l) \geq m_{xj} \\ \sum_{j=1}^{M} m_{xj} = 1 \end{array}\right.\right\},$$

and wherein V is a failure scenario set, v is a failure scenario, $\delta_j$ is the biggest utilization rate of the controller, $\varphi_j$ is a unit capacity cost of the controller, $v_{ij}^l$ refers to a state of secure link between the switch $s_i$ and the controller $c_j$, $v_j^f$ refers to a state of the controller $c_j$, $\rho_j$ refers to a cost for increasing one unit of capacity for the controller $c_j$, S refers to a set of switches, $S^f$ refers to a set of failed switches, $|S^f|$ refers to a number of the failed switches, $m_{xj}$ refers to whether the controller $c_j$ is the master controller of the switch $s_i$, and M refers to a number of controllers of the control plane.

6. The robustness verification method according to claim 5, wherein an expanded capacity is obtained by performing calculation for the capacity expansion criterion based on the iterative algorithm.

7. A robustness verification system for a distributed control plane in a software-defined network, comprising:
   a constructing module, configured to construct a robustness verification framework, wherein the robustness verification framework accommodates a failure scenario set and a failure recovery strategy set;
   a selecting module, configured to select a failure recovery strategy and query a worst failure scenario under the failure recovery strategy;
   an obtaining module, configured to verify a utilization rate of a biggest controller in the control plane under the combination of the worst failure scenario and the failure recovery strategy; and
   a verifying module, configured to verify robustness of the control plane based on the utilization rate;
wherein the formula used by the verifying module to verify the robustness of the control plane is as follows:

$$\max \hat{w}(v)$$

$$\text{s.t.} \begin{cases} \sum_{j=1}^{M} v_j^f \leq f \\ \sum_{i=1}^{N}\sum_{j=1}^{M} v_{ij}^l \leq l \\ \{v_j^f, v_{ij}^l\} \in \{0,1\} \end{cases}$$

wherein N is a number of switches in the control plane, M is a number of controllers in the control plane, $v_{ij}^l$ refers to a state of a secure link between the switch $s_i$ and the controller $c_j$, $v_j^f$ refers to a state of the controller $c_j$, and max $\hat{w}(v)$ is a failure recovery strategy.

8. The robustness verification system according to claim 7, wherein the method of querying the worst failure scenario by the selecting module is a recursive algorithm.

9. The robustness verification system according to claim 8, wherein failure scenarios are reduced by the branch and bound method to reduce an operation time of the recursive algorithm.

10. The robustness verification system according to claim 7, wherein the manner of verifying the robustness of the control plane by the verifying module based on the utilization rate is determining a relationship of F* and 1, and if F*<1, it is considered that the control plane is capable of satisfying design requirements and otherwise capacity expansion is performed for the control plane.

11. The robustness verification system according to claim 10, wherein the capacity expansion is performed based on the following capacity expansion criterion:

$$\min_{\delta\geq 0}\max_{v\in V}\min\left\{\sum_{j=1}^{M}\varphi_j\delta_j \left| \begin{array}{l} U\rho_j(1-v_j^f) \geq \sum_{i=1}^{|S-S^f|} r_i m_{ij}^* + \sum_{x=1}^{|S^f|} r_x m_{xj} \\ b_{xj}(1-v_{xj}^l) \geq m_{xj} \\ \sum_{j=1}^{M} m_{xj} = 1 \end{array}\right.\right\}$$

wherein V is a failure scenario set, v is a failure scenario, $\delta_j$ is the biggest utilization rate of the controller, $\varphi_j$ is a unit capacity cost of the controller, $v_{ij}^l$ refers to a state of secure link between the switch $s_i$ and the controller $c_j$, $v_j^f$ refers to a state of the controller $c_j$, $\rho_j$ refers to a cost for increasing one unit of capacity for the controller $c_j$, S refers to a set of switches, $S^f$ refers to a set of failed switches, $|S^f|$ refers to a number of the failed switches, $m_{xj}$ refers to whether the controller $c_j$ is the master controller of the switch $s_i$, and M refers to a number of controllers of the control plane.

12. The robustness verification system according to claim 11, wherein an expanded capacity is obtained by performing calculation for the capacity expansion criterion based on the iterative algorithm.

\* \* \* \* \*